United States Patent [19]

Ureshino et al.

[11] Patent Number: 5,505,600
[45] Date of Patent: Apr. 9, 1996

[54] DIE CHANGER TRUCK FOR USE WITH TIRE VULCANIZER

[75] Inventors: Kashiro Ureshino; Kenji Kubo, both of Takasago, Japan

[73] Assignee: Kabushiki Kaisha Kobe Seiko Sho, Kobe, Japan

[21] Appl. No.: 230,698

[22] Filed: Apr. 21, 1994

[30] Foreign Application Priority Data

May 7, 1993 [JP] Japan .................................. 5-131072

[51] Int. Cl.⁶ .................................... B29C 35/02
[52] U.S. Cl. ................. 425/28.1; 425/35; 425/48; 425/186; 425/195
[58] Field of Search .................... 425/28.1, 34.1, 425/35, 48, 183, 186, 195

[56] References Cited

U.S. PATENT DOCUMENTS

| | | | |
|---|---|---|---|
| 2,997,738 | 8/1961 | Soderquist | 425/48 |
| 4,604,043 | 8/1986 | Pizzorno et al. | 425/48 |
| 4,946,358 | 8/1990 | Okuda et al. | 425/186 |
| 5,219,587 | 6/1993 | Seto et al. | 425/186 |
| 5,271,727 | 12/1993 | Irie | 425/34.1 |

*Primary Examiner*—James P. Mackey
*Attorney, Agent, or Firm*—Oblon, Spivak, McClelland, Maier & Neustadt

[57] ABSTRACT

A die changer truck for use with a tire vulcanizer, including a self-propelled chassis adapted to halt in front of the tire vulcanizer, a swiveling table rotatably mounted on the self-propelled chassis, two mounting sections for respectively mounting two die assemblies, and two carrier units for respectively carrying two bladder assemblies. The two mounting sections and the two carrier units are provided as two sets on the swiveling table. The two sets are selectively positioned by rotation of the swiveling table. Accordingly, the carriage and change of not only the die assemblies but also the bladder assemblies with respect to the tire vulcanizer can be automated.

4 Claims, 6 Drawing Sheets

DIE CHANGER TRUCK FOR USE WITH TIRE VULCANIZER

BACKGROUND OF THE INVENTION

1. Field of the Invention

The present invention relates to a die changer truck for carrying a die assembly and/or a bladder assembly to a tire vulcanizer.

2. Description of the Related Art

A conventional tire vulcanizer to which this kind of die changer truck is applied will now be described with reference to FIG. 6.

Figure 6:
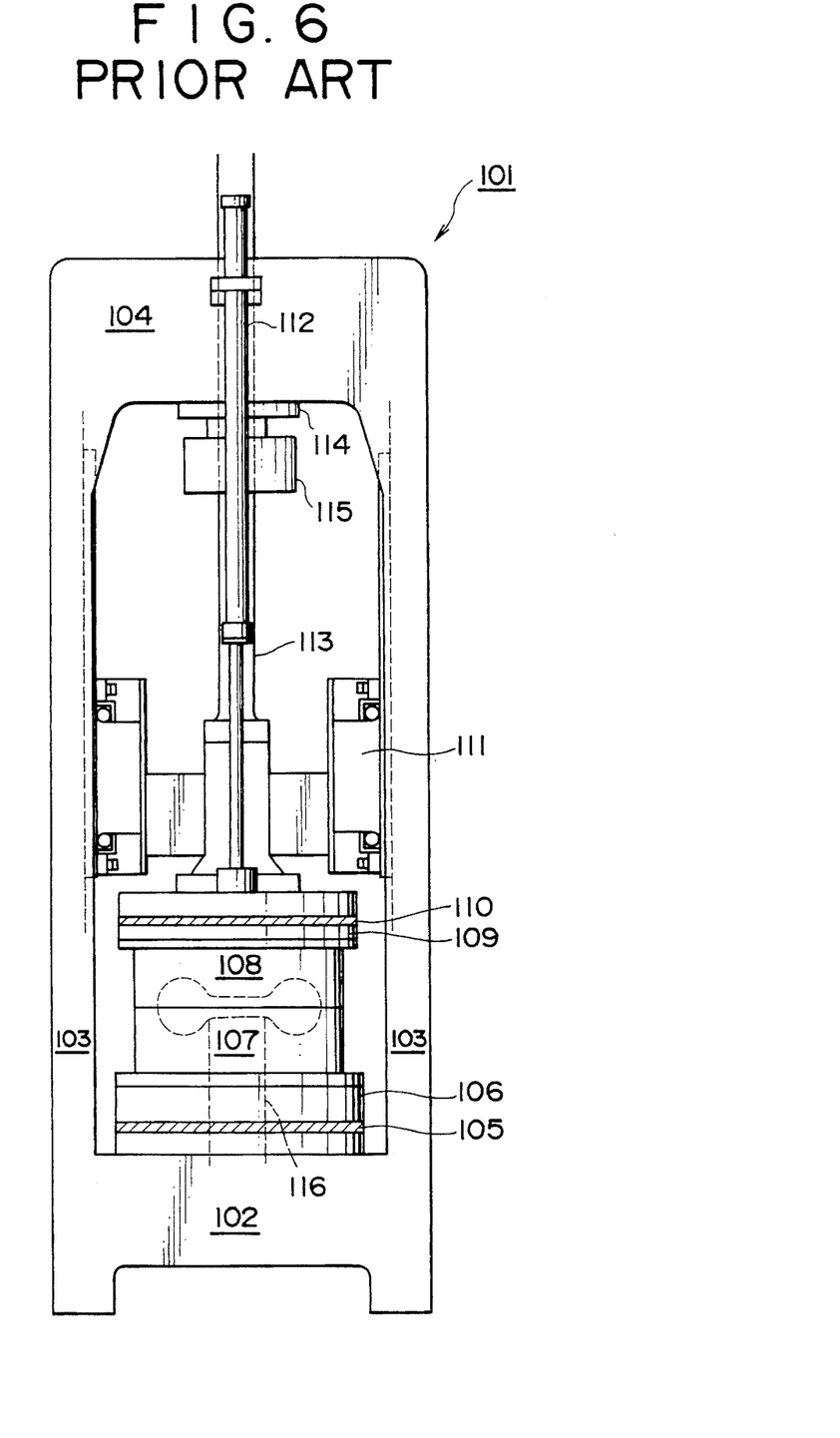
FIG. 6 is a front elevation of a tire vulcanizer to which the die changer truck according to the present invention may be applied.

As shown in FIG. 6, reference numeral 101 generally denotes a vertical type, hydraulic tire vulcanizer. The tire vulcanizer 101 has a frame consisting of a base frame 102, a pair of opposed side frames 103, and a top frame 104. A heat insulating plate 105 and a lower heating plate 106 are fixedly mounted on the base frame 102 by bolts or the like. A lower mold 107 is mounted on the lower heating plate 106. An upper mold 108 releasable from the lower mold 107 is fixed through an upper heating plate 109 and a heat insulating plate 110 to a slider 111. The slider 111 is connected to a vertical cylinder 112 supported to the top frame 104, so that the slider 111 can be vertically moved with the upper mold 108 by driving the vertical cylinder 112. Further, a pressure transmitting rod 113 is so provided as to stand from the slider 111, and a hollow pressing cylinder 114 is fixed to the top frame 104, so that a pressure can be transmitted from the hollow pressing cylinder 114 through a releasable half nut 115 to the pressure transmitting rod 113.

In the tire vulcanizer mentioned above, the die, or the lower mold 107 and the upper mold 108, must be occasionally changed in changing a tire size, in cleaning and repairing the die, etc. The change of the die is carried out in the following three steps. In the first step, the assembly of the lower mold 107 and the upper mold 108 is temporarily put on the lower heating plate 108. At this time, the slider 111 is kept in an upper limit position thereof. This first step is performed by using a forklift or the like. In the second step, the lower mold 107 is positioned with respect to the lower heating plate 108 and is fixed thereto. This second step is normally manually performed by a skilled operator operating a forklift or the like. Finally in the third step, the slider 111 is lowered, and the upper mold 108 is fixed to the upper heating plate 109 by bolts or the like.

Prior to the working of the first to third steps, it is necessary to remove an old bladder assembly mounted on a central mechanism 116 located at the center of the lower mold 107. Further, after the working of the first to third steps, a new bladder assembly must be mounted on the central mechanism 116. Such removal and mounting of the bladder assemblies are manually carried out, and transportation of the bladder assemblies is carried out by using a forklift or the like.

In this manner, transportation of the die assembly and the bladder assembly to be changed is carried out by using a forklift or the like, thus requiring a long time of die change and further requiring labor for manual operation of the die change. In particular, the tire industry has recently been entering the times of multi-item small-lot production like some other industries, resulting in an increase in frequency of the die change. Accordingly, if the die change spending much time is frequently carried out, the rate of operation of the tire vulcanizer is reduced and much labor is required.

SUMMARY OF THE INVENTION

It is accordingly an object of the present invention to provide a die changer truck for use with a tire vulcanizer which can automate the carriage and change of not only a die assembly but also a bladder assembly with respect to the tire vulcanizer.

According to a first aspect of the present invention, there is provided a die changer truck for use with a tire vulcanizer, comprising a self-propelled chassis adapted to halt in front of the tire vulcanizer, a mounting section for mounting a die assembly, and a carrier unit for carrying a bladder assembly, the mounting section and the carrier unit being provided as at least one set on the self-propelled chassis. Preferably, two sets of mounting sections and carrier units mentioned above are selectively positioned.

According to a second aspect of the present invention, there is provided a die changer truck for use with a tire vulcanizer, comprising a self-propelled chassis adapted to halt in front of the tire vulcanizer, a swiveling table rotatably mounted on the self-propelled chassis, two mounting sections for respectively mounting two die assemblies, and two carrier units for respectively carrying two bladder assemblies, the two mounting sections and the two carrier units being provided as two sets on the swiveling table, the two sets being selectively positioned by rotation of the swiveling table. Preferably, a sliding table is further provided between the self-propelled chassis and the swiveling table so as to slidably move toward the tire vulcanizer, so that the swiveling table on which the two sets of mounting sections and carrier units are provided can be advanced toward the tire vulcanizer by sliding the sliding table.

With the arrangement according to the first aspect mentioned above, the mounting section for mounting the die assembly and the carrier unit for carrying the bladder assembly are provided as at least one set. Accordingly, the bladder assembly can be changed successively-before or after changing the die assembly. In the case where two sets of mounting sections and carrier units are provided, the carriage of an old bladder assembly and an old die assembly from the tire vulcanizer to the die changer truck and the carriage of a new bladder assembly and a new die assembly from the die changer truck to the tire vulcanizer can be continuously performed.

With the arrangement according to the second aspect mentioned above, when the self-propelled chassis is halted in front of the tire vulcanizer, an old die assembly and/or an old bladder assembly are/is received from the tire vulcanizer to the die changer truck. Then, the swiveling table is rotated to carry a new die assembly and/or a new bladder assembly from the die changer truck to the tire vulcanizer. In the case where a green tire receiving table or the like is provided in front of the tire vulcanizer to hinder the approach of the self-propelled chassis to the tire vulcanizer, the swiveling table is advanced toward the tire vulcanizer by sliding the sliding table toward the tire vulcanizer.

As described above, in the die changer truck according to the present invention, the die assembly and the bladder assembly can be changed as one set. Accordingly, the bladder assembly can be changed successively to the change of the die assembly. Thus, the change of dies and the change of bladders can be performed in series, thereby realizing a fully automated operation to greatly reduce a change-time and achieve labor saving.

Further, the die changer truck can be traveled along a line of plural tire vulcanizers, and the swiveling table can be rotated to enable the change of old and new die assemblies and/or old and new bladder assemblies in one motion. As required, the swiveling table can be advanced toward the tire vulcanizer by sliding the sliding table. Thus, an automated change operation to the plural tire vulcanizers can be realized by the single die changer truck.

Other objects and features of the invention will be more fully understood from the following detailed description and appended claims when taken with the accompanying drawings.

DESCRIPTION OF THE PREFERRED EMBODIMENT

Figure 1A:
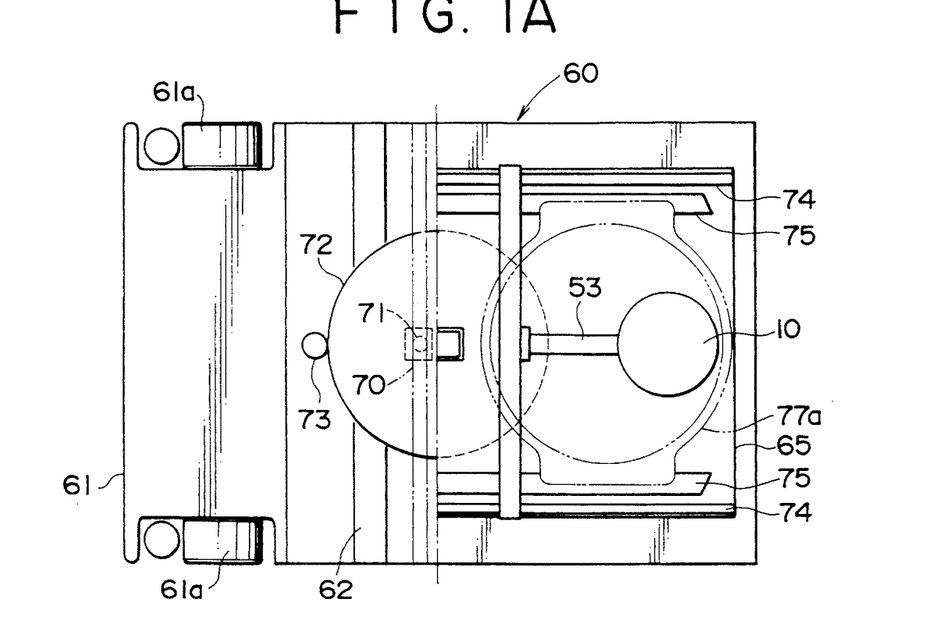
FIG. 1A is a top plan view of a die changer truck according to the present invention with a part thereof omitted.
Figure 1B:
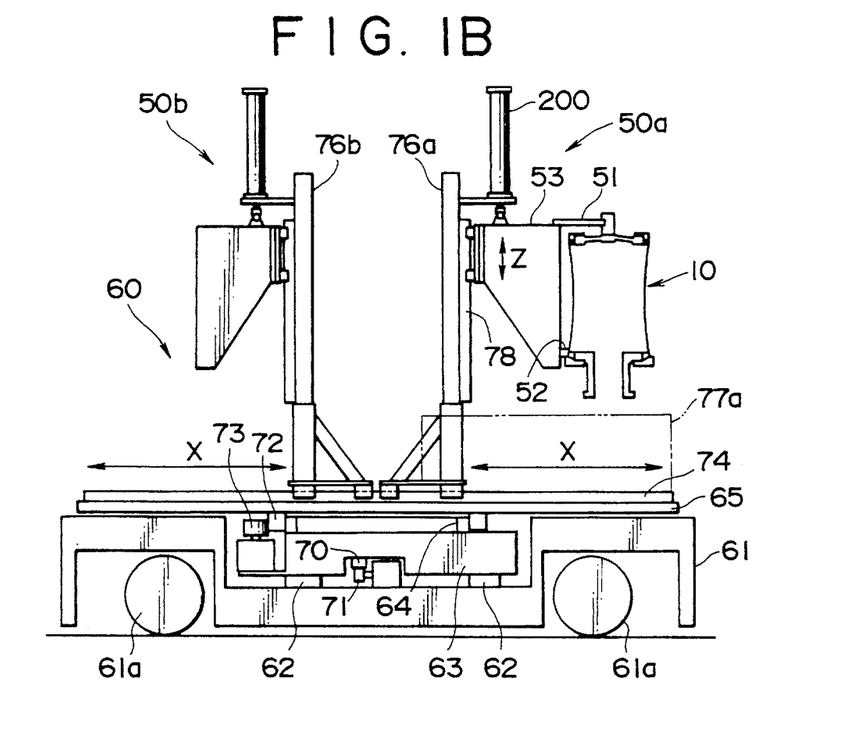
FIG.1B is a side view of the die changer truck shown in FIG. 1A with a part thereof omitted.

There will now be described a preferred embodiment of the present invention with reference to the drawings, in which FIG. 1A is a top plan view of a die changer truck according to the present invention with a part thereof omitted; FIG.1B is a side view of the die changer truck shown in FIG. 1A with a part thereof omitted; and FIG. 2 is a plan view illustrating the operation of the die changer truck shown in FIGS. 1A and 1B.

Referring to FIGS. 1A and 1B., reference numeral 60 generally designates the die changer truck. The die changer truck 60 has a three-layer structure consisting of a self-propelled chassis 61 having four wheels 61a, a sliding table 63 adapted to slide on a pair of rails 62 laid on the chassis 61 so as to extend in a transverse direction of the chassis 61, a swiveling table 65 adapted to swivel along a ring rail 64 mounted on the sliding table 63 at the center thereof. The sliding table 63 is slidably driven by a rack 70 and a drive pinion 71 meshing with each other. The swiveling table 65 is rotatably driven 180° at one time by an external gear 72 and a drive pinion 73 meshing with each other.

A pair of outside rails 74 and a pair of inside rails 75 are laid on the swiveling table 65 so as to extend in a longitudinal direction thereof. A pair of stand frames 76a and 76b (constituting carrier units 50a and 50b, respectively) are adapted to reciprocatably slide on the outside rails 74 in a direction depicted by a double-headed arrow X. A die assembly 77a is adapted to slide on the inside rails 75 in the direction of the arrow X. A bladder assembly 10 is supported to the carrier unit 50a. Although not shown, another die assembly similar to the die assembly 77a is adapted to slide on the inside rails 75, and another bladder assembly similar to the bladder assembly 10 is supported to the carrier unit 50b. Thus, the swiveling table 65 has a mounting position for mounting a set of new die assembly and new bladder assembly and another mounting position for mounting a set of old die assembly and old bladder assembly to be replaced by the above new die assembly and the above new bladder assembly, respectively. Further, one of the two mounting positions can be selected by 180° rotation of the swiveling table 65. The carrier unit 50a has the following structure. That is, an arm 53 is slidable on a rail 78 laid on the stand frame 76a so as to be vertically moved by a cylinder 200 in a direction depicted by a double-headed arrow Z. A pair of clamps 51 and 52 are so provided as to project from the upper and lower ends of the arm 53, respectively. The upper and lower clamps 51 and 52 function to clamp the bladder assembly 10 maintained in its vertical attitude. The other carrier unit 50b also has a similar structure; so the explanation thereof will be omitted herein.

Figure 2:
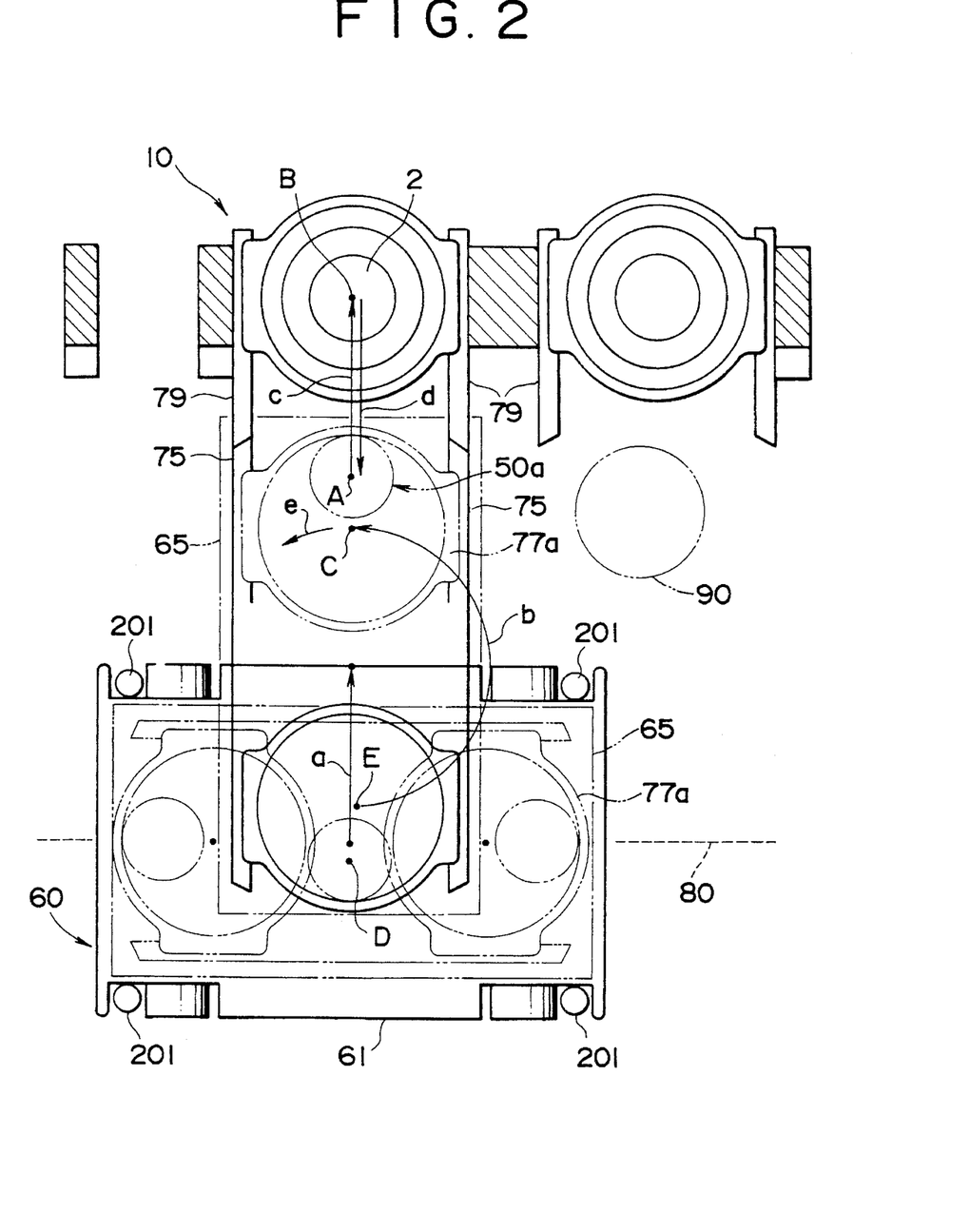
FIG. 2 is a plan view illustrating the operation of the die changer truck shown in FIGS. 1A and 1B.

Referring to FIG. 2, the die changer truck 60 is adapted to travel along a dashed line 80 parallel to a line of arrangement of plural tire vulcanizers. When the die changer truck 60 comes to a position before one of the tire vulcanizers which requires the change of the old bladder assembly and/or the old die assembly, the travel of the die changer truck 60 is halted in front of the tire vulcanizer thus required, and a given horizontal attitude of the die changer truck 60 in this stop position is provided by four position stabilizers 201. Reference numeral 90 denotes a green tire receiving table. The self-propelled chassis 61 of the die changer truck 60 travels so as not to interfere with the green tire receiving table 90. In the stop position before the tire vulcanizer mentioned above, the sliding table 63 (not shown in FIG. 2) slides in a direction depicted by an arrow a, and the swiveling table 65 swivels 90° in a direction depicted by an arrow b. In this condition, the inside rails 75 on the swiveling table 65 are connected and aligned to a pair of rails 79 provided in the tire vulcanizer. Then, the stand frame 76a (not shown in FIG. 2) slides in a direction depicted by an arrow c to advance the carrier unit 50a to a position just over a central mechanism 2 in the tire vulcanizer. Then, the arm 53 is lowered in the direction of the arrow Z (see FIG.1B) to clamp the old bladder assembly 10 in the tire vulcanizer by operating the upper and lower clamps 51 and 52 shown in FIG. 1B. At this time, a chuck for retaining a top ring of the old bladder assembly 10 is in an open condition, and a locking device for locking a bottom ring of the old bladder assembly 10 is in a released condition. Such a mechanism will be hereinafter described in detail. Then, the arm 53 clamping the old bladder assembly 10 by means of the upper and lower clamps 51 and 52 is raised in the direction of the arrow Z to thereby remove the old bladder assembly 10 from the central mechanism 2. Then, the stand frame 76a slides in a direction depicted by an arrow d to return the carrier unit 50a to a home position A. Then, the old die assembly in the tire vulcanizer is pushed from a position B to a position C. Then, the swiveling table 65 swivels 180° in a direction depicted by an arrow e to thereby move the new bladder assembly 10 located in a position D to the position A and simultaneously move the new die assembly located in a position E to the position Co Then, the new die assembly is set into the position B in the tire vulcanizer, and the new bladder assembly 10 is mounted to the central mechanism 2.

In this manner, the change of the bladder assemblies can be performed simultaneously with the change of the die assemblies. However, the change of the bladder assemblies only may be performed, of course, by using the die changer truck 60. Thus, the change of the die assemblies and/or the bladder assemblies can be automatically performed in contrast with the conventional manual changing operation.

The structure of the bladder assembly 10 will be described with reference to FIG. 3. The bladder assembly 10 includes a bladder 11 as a rubber bag, a top ring 12 nipping the upper end of the bladder 11, and a bottom ring 13 nipping the lower end of the bladder 11. The bottom ring 13 has a central hole 13a engaging with a hub 4, a flange portion 13b abutting against a shoulder portion of the hub 4, and a bead ring 13c engaging with a lower mold 1. The top ring 12 has a central conical hole 12a. The central conical hole 12a engages with a conical shaft 3a formed at the upper end of a center post 3, thereby positioning the top ring 12.

A chuck 21 is openably provided inside the conical shaft 3a of the center post 3 so as to hold the top ring 12 to the center post 3. Further, a locking device 22 is releasably provided on the flange portion 13b of the bottom ring 13 so as to lock the bottom ring 13 to the hub 4. Accordingly, the bladder assembly 10 is detachably fixed in a given position to the central mechanism 2 by the chuck 21 and the locking device 22. The chuck 21 is a collet chuck having a nose 21a and openable jaws 21b. In a chucking operation, an extension rod 24 is lowered by a coned disc spring 26 to make the jaws 21b draw the nose 21a. On the other hand, when the extension rod 24 is raised by a cylinder 28, the jaws 21b are opened to release the nose 21a.

Figure 3:
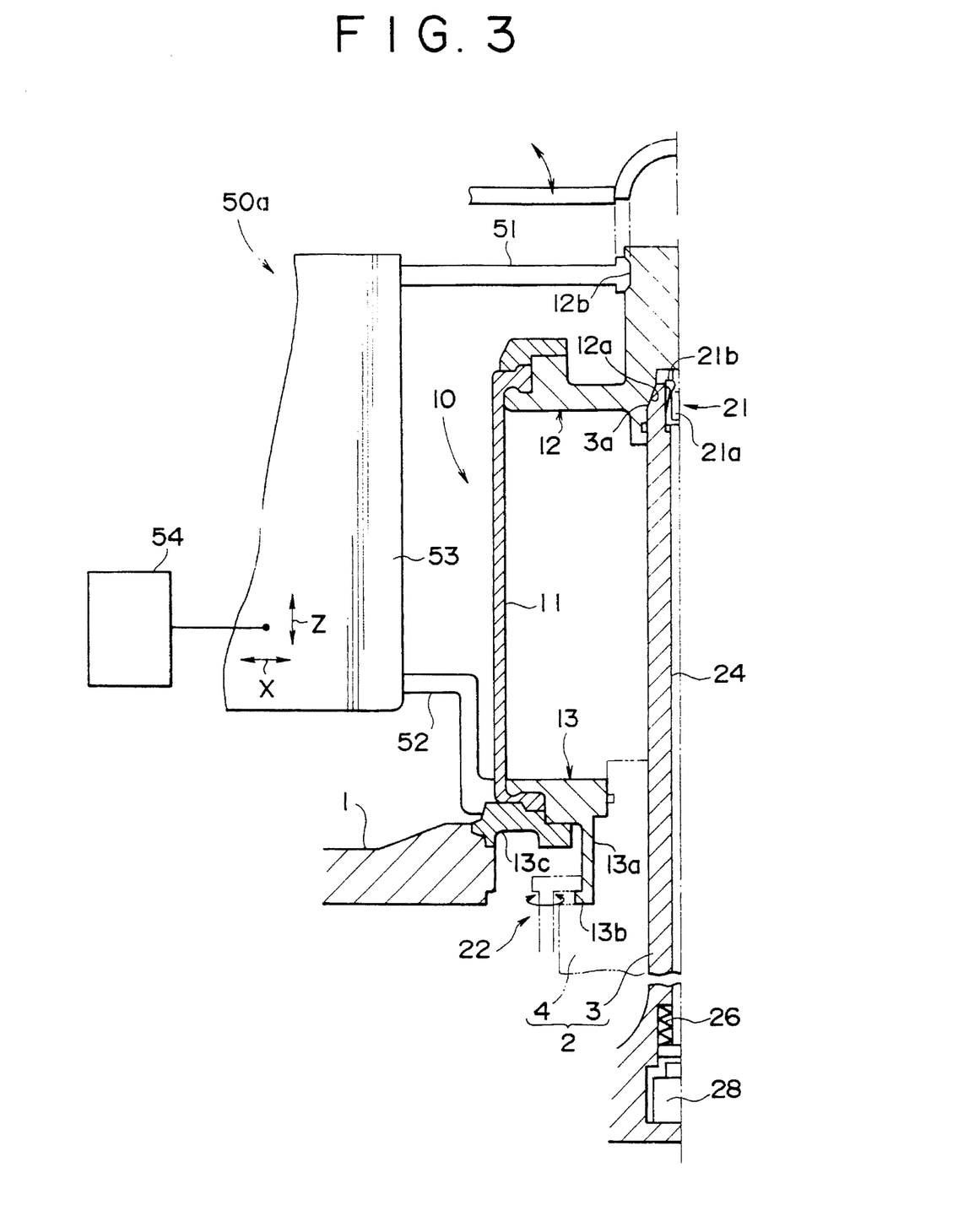
FIG. 3 is a partially sectional side elevation of a bladder assembly and a carrier unit therefor according to the present invention.

The carrier unit 50a functions to carry the bladder assembly 10 to a position just over the central mechanism 2 and set the bladder assembly 10 in the given position shown in FIG. 3. The carrier unit 50a includes the upper clamp 51 adapted to openably grasping a ring groove 12b of the top ring 12, the lower clamp 52 adapted to openably grasping the bead ring of the bottom ring 13, the arm 53 from which the upper and lower clamps 51 and 52 project toward the bladder 11, and driving means 54 for advancing and retracting the arm 53 with respect to the central mechanism 2 and for raising and lowering the arm 53 with respect to the central mechanism 2.

In setting the bladder assembly 10 to the given position shown in FIG. 3, the bladder assembly 10 held by the upper and lower clamps 51 and 52 is advanced to the position just over the central mechanism 2 by the driving means 54, and is then lowered toward the central mechanism 2, thus obtaining the set position of the bladder assembly 10 in the tire vulcanizer. At this time, the chuck 21 is in the open condition and the locking device 22 is in the released condition. Then, the chuck 21 is closed and the locking device 22 is operated to become a locking position, thus automatically fix the bladder assembly 10 to the central mechanism 2. In removing and carrying the bladder assembly 10 from the central mechanism 2, a similar operation is automatically performed in the reverse procedure.

Figure 4:
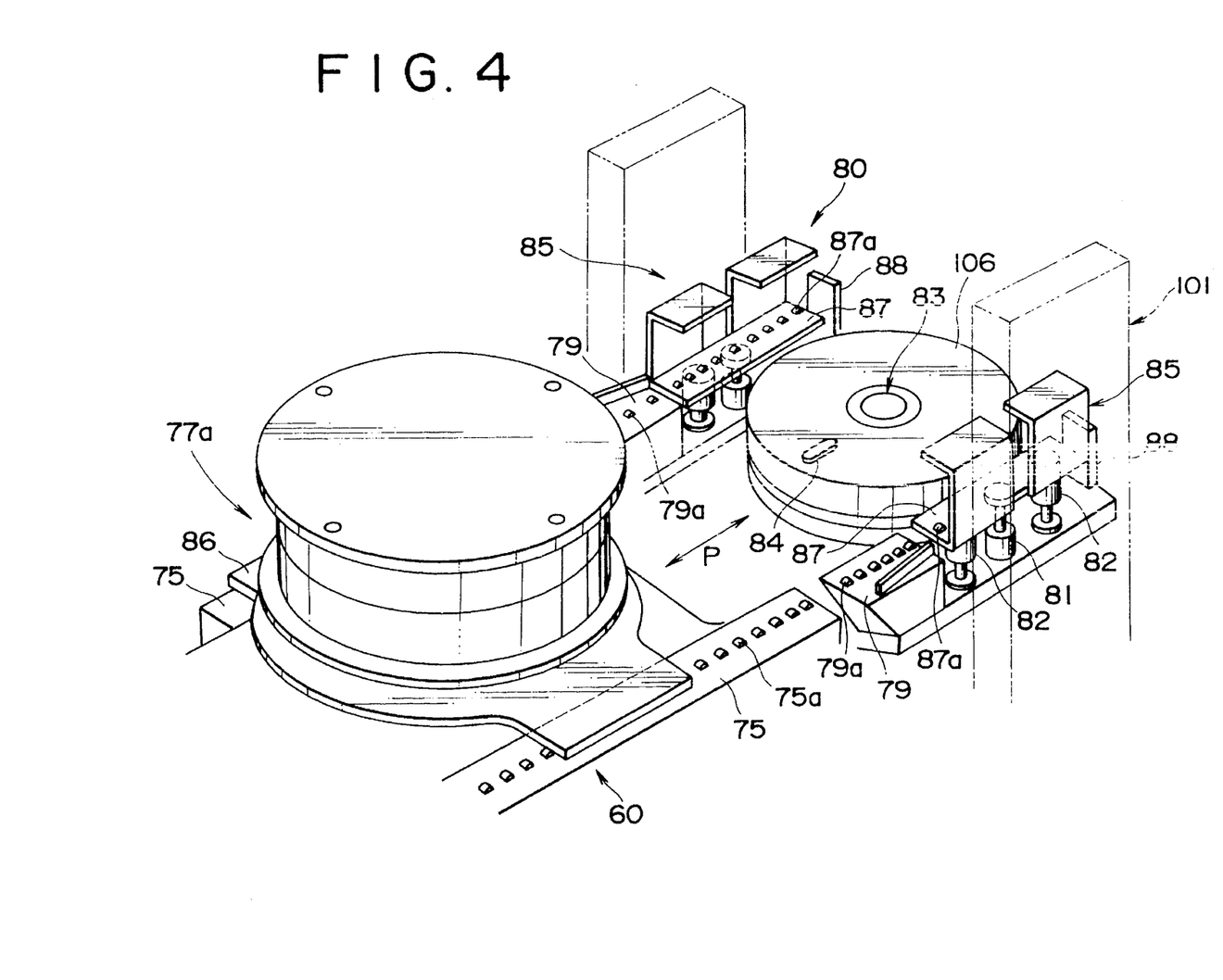
FIG. 4 is a perspective view of a die setting device according to the present invention.

Now, a die setting device 80 provided in the tire vulcanizer will be described with reference to FIGS. 4 and 5. The die setting device 80 is primarily composed of a pair of rails 79, a pair of clamps 85, a hydraulic cylinder 81 for driving each clamp 85, two guides 82 for guiding each clamp 85, a register ring 83, and a key 84. The register ring 83 and the key 84 constitute positioning means.

The die assembly 77a is integrally formed with an adapter plate 86. The rails 75 mounted on the die changer truck 60 has a plurality of drive rollers 75a for drivingly supporting the die assembly 77a. Similarly, the rails 79 of the die setting device 80 has a plurality of drive rollers 79a for drivingly supporting the die assembly 77a. Thus, the die assembly 77a is adapted to slide on the rails 75 through the drive rollers 75a and on the rails 79 through the drive rollers 79a in a direction depicted by an arrow P to enter a space defined between the two clamps 85. The clamps 85 are vertically moved by the two hydraulic cylinders 81 as being guided by the totally four guides 82. The two clamps 85 are also provided with a pair of rails 87 each having a plurality of drive rollers 87a, respectively. The two rails 87 extend continuously from the two rails 79, respectively. When the clamps 85 having received the die assembly 77a with the adapter plate 86 are lowered, the adapter plate 86 is urged on a lower mold mounting member 106 by the clamps 85. Further, a stopper 88 is mounted on the rear end of each rail 87, so that the forward end of the adapter plate 86 is adapted to abut against the stopper 88. The lower mold mounting member 106 includes the register ring 83 and the key 84 for positioning the adapter plate 86.

Figure 5:
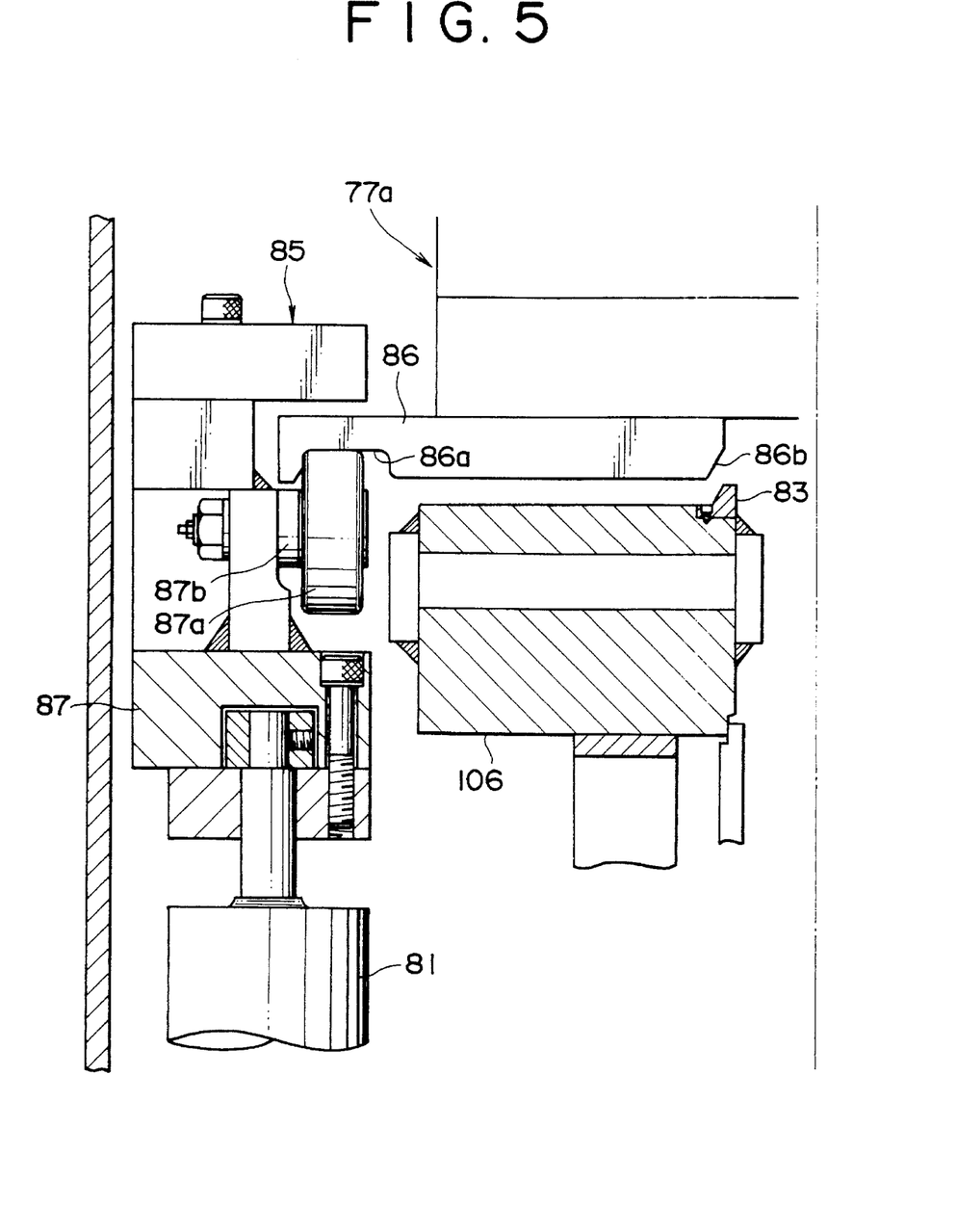
FIG. 5 is a sectional view of an essential part of the die setting device shown in FIG. 4.

Referring to FIG. 5, there is shown a specific guiding structure for the adapter plate 96. A left half portion of the guiding structure is merely shown in FIG. 5 because it is the same as a right half portion of the guiding structure. The adapter plate 86 is formed with a pair of guide grooves 86a engaging with the drive rollers 87a of the rails 87. A plurality of spacers 87b are interposed between the drive rollers 87a and the rails 87. The spacers 87b have different thicknesses gradually decreasing from the front ends of the rails 87 toward the rear ends of the rails 87. That is, the spacers 87b corresponding to the drive rollers 87a located at the front ends of the rails 87 have the largest thickness, and the spacers 87b corresponding to the drive rollers 87a located at the rear ends of the rails 87 have the smallest thickness. Accordingly, the drive rollers 87a located at the front ends of the rails 87 engage with the guide grooves 87b with right and left spaces defined between the opposite side surfaces of each drive roller 87a and the opposite side surfaces of each guide groove 86b. On the other hand, the drive rollers 87a located at the rear ends of the rails 87 engage with the guide grooves 86a with the outer side surface of each drive roller 87a abutting against the outer side surface of each guide groove 86b as shown. Thus, when the adapter plate 86 drawn into the space between the clamps 85 by the drive rollers 87a abuts against the stoppers 88 mounted on the rear ends of the rails 87, the center position of the adapter plate 86 is decided. Thereafter, the clamps 85 are lowered by the hydraulic cylinders 81 to make a reference hole 86b of the adapter plate 86 engage with the register ring 83, thereby centering the adapter plate 86 and urging it on the lower mold mounting member 106.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A die changer truck for use with a tire vulcanizer, comprising a self-propelled chassis adapted to halt in front of said tire vulcanizer, a mounting section for mounting a die assembly, and a carrier unit for carrying a bladder assembly, said mounting section and said carrier unit being provided as at least one set on said self-propelled chassis.

2. A die changer truck for use with a tire vulcanizer according to claim 1, wherein said at least one set of said mounting section and said carrier unit comprises two sets of mounting sections for respectively mounting two die assemblies and carrier units for respectively carrying two bladder assemblies, said two sets being selectively positioned at said tire vulcanizer.

3. A die changer truck for use with a tire vulcanizer, comprising a self-propelled chassis adapted to halt in front of said tire vulcanizer, a swiveling table rotatably mounted on said self-propelled chassis, two mounting sections for respectively mounting two die assemblies, and two carrier units for respectively carrying two bladder assemblies, said two mounting sections and said two carrier units being provided as two sets on said swiveling table, said two sets being selectively positioned at said tire vulcanizer by rotation of said swiveling table.

4. A die changer truck for use with a tire vulcanizer, comprising a self-propelled chassis adapted to halt in front of said tire vulcanizer, a sliding table slidably mounted on said self-propelled chassis so as to move toward said tire vulcanizer, a swiveling table rotatably mounted on said sliding table, two mounting sections for respectively mounting two die assemblies, and two carrier units for respectively carrying two bladder assemblies, said two mounting sections and said two carrier units being provided as two sets on said swiveling table, said two sets being selectively positioned at said tire vulcanizer by sliding movement of said sliding table and rotation of said swiveling table.

* * * * *